United States Patent [19]
Hessen
[11] 3,934,453
[45] Jan. 27, 1976

[54] CONSERVATOR SYSTEM

[75] Inventor: Petter Hessen, Vasteras, Sweden
[73] Assignee: Allmanna Svenska Elektriska Aktiebolaget, Vasteras, Sweden

[22] Filed: Oct. 25, 1974
[21] Appl. No.: 518,151

[52] U.S. Cl. 73/19; 174/11 R; 174/12 R; 174/14 R
[51] Int. Cl.². G01D 7/04; H01G 5/04; H02G 15/26
[58] Field of Search 73/19; 336/57, 58, 94; 220/85 TC; 174/17 LF:12 R, 14 R, 11 R

[56] References Cited

UNITED STATES PATENTS

| | | | |
|---|---|---|---|
| 513,421 | 1/1894 | Rowland | 336/58 X |
| 1,693,265 | 11/1928 | Austin | 174/12 R |
| 1,705,721 | 3/1929 | Dann | 336/58 X |
| 1,871,449 | 8/1932 | Eschholz | 336/58 X |
| 1,904,423 | 4/1933 | Eby | 174/12 R X |
| 3,335,343 | 8/1967 | Moore et al. | 317/244 |
| 3,448,219 | 6/1969 | Nakazawa et al | 336/58 X |

*Primary Examiner*—James J. Gill

[57] ABSTRACT

A conservator system for transformers includes a conservator tank. The apparatus is filled with oil which is saturated with a non-combustible gas. The conservator tank is connected by conduits to the top and if suitable also to the bottom of the transformer tank, respectively. The top of the conservator tank is filled with free non-combustible gas. A bag of flexible material is arranged in the top of the conservator tank and the interior of this bag is connected to the atmosphere so that it separates the oil and the gas in the tank from the atmosphere.

6 Claims, 1 Drawing Figure

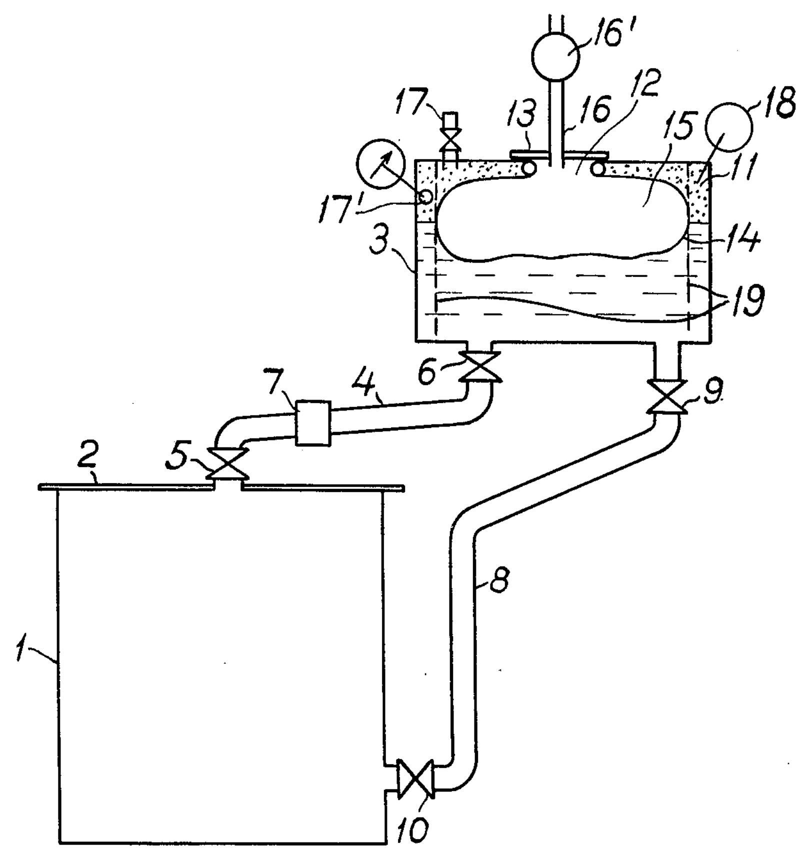
16'
17
13
16
12
15
18
11
17'
3
14
19
7
4
6
9
2
5
8
1
10

CONSERVATOR SYSTEM

BACKGROUND OF THE INVENTION

1. Field of the Invention

The present invention relates to a conservator system for transformers, reactors and similar oil-filled and oil-insulated apparatus, in which the oil is saturated with a non-combustible gas such a nitrogen, carbon dioxide or the like. The conservator tank may be arranged for circulation of oil through an inlet from the upper portion of the transformer tank and an outlet to the lower portion of the transformer tank. This arrangement equilibrates continuously gas-in-oil content in the conservator tank and the transformer tank respectively.

SUMMARY OF THE INVENTION

According to the invention, a conservator tank is connected to the transformer or the like which is filled with oil which is saturated with a non-combustible gas. The saturated condition of the oil is maintained by conduits connecting the bottom of the conservator tank to the top and bottom of the transformer through which the oil can circulate. Above the oil in the conservator tank is the non-combustible gas. A bag of flexible material is arranged in the top of the conservator tank and the inside of this bag is connected to the atmosphere. The bag separates the oil and the free gas from the atmosphere.

A conservator system according to the invention has several advantages which contribute to make transformers reliable in service. Some of the advantages are the following:

1. Reduced risk of explosion because the oil is saturated with a non-combustible gas.

2. Gas release is avoided because the pressure on the oil is maintained at atmospheric pressure. In this way the gas bubbling effect due to supersaturated conditions is avoided and consequently also the inherent reduction of electric withstand strength.

3. Maintaining the atmospheric pressure in the oil in combination with oil being saturated with inert gas results in a considerably reduced risk of air intake, for example at low oil levels.

4. The proposed system combines the advantages of an inert gas system with the advantages of a breathing system, resulting in an inert gas system with constant atmospheric pressure and no gas consumption.

5. Maintaining free inert gas above the oil surface enables instruments known per se to be used for indicating combustible gas development in the transformer in operation.

6. The air is separated from the oil and this eliminates the risk that the oil will absorb moisture from the air.

BRIEF DESCRIPTION OF THE DRAWINGS

The accompanying drawing illustrates the invention as applied to a transformer.

DESCRIPTION OF THE PREFERRED EMBODIMENTS

A transformer 1 has a lid 2 and a conservator tank 3. A conduit 4 with valves 5 and 6 conveys hot oil from the upper portion of the transformer tank to the conservator tank. The pipe can also include a gas bubble indicating device 7. Another conduit 8 with valves 9 and 10 may be inserted to lead oil from the conservator tank to the transformer tank, preferably to its lower part.

The oil is saturated with a non-combustible gas, such as nitrogen gas, carbon dioxide or the like. To avoid negative pressure in the system and the resultant risk that air will leak into it, primarily into the top of the conservator tank, there should always be a certain amount of free gas at the upper portion of the conservator tank and this is indicated by the numeral 11. The top opening 12 of the conservator tank is covered on the upper side by a lid 13. To the edge of the opening there is further connected a rubber diaphragm 14, forming a bag 15 located in the conservator tank, said bag communicating with the outside air through a tube 16. A drying apparatus 16' may be inserted in the tube 16 to reduce the moisture which may enter into the bag due to changes of the amount of air of the bag. Control of the amount of gas and any filling of gas can be performed through a tube 17 provided with a valve at the upper portion of the conservator tank. In the gaseous space above the oil there can be applied a device 17', known per se, for indicating the level of the oil surface. This device may be a floating body which influences an indicating device outside the conservator tank magnetically.

By the fact that the conservator tank is connected to the transformer tank through two tubes opening out at different levels in the tank, the temperature difference between the orifices of the tubes in the tank will maintain a continuous flow of oil in the system. This means that the oil is in permanent contact with the gas in the conservator tank and thus maintains a saturation equilibrium. Furthermore, a certain amount of cooling of the oil is obtained.

In the gas space above the oil a device 18, known per se, can be inserted for indicating development of combustible gas in the transformer during operation.

The conservator tank is designed in such a way that there is always a free surface between gas and oil. This can be achieved by inserting retainers in the form of at least one perforated wall 19 in the conservator tank to prevent the bag 15 from blocking gas interchange between oil and gas space.

I claim:

1. Conservator system for apparatus filled with oil which is saturated with a non-combustible gas, comprising a conservator tank, means connected with the conservator tank for circulation of oil through an inlet from the upper portion of the apparatus and an outlet to the lower portion of the apparatus, in which free non-combustible gas is present in an upper portion of the conservator tank above the oil level therein, an elastic diaphragm (14) in the conservator tank separating the oil and free non-combustible gas located above the oil level from the atmosphere, thereby providing a space on the side of the diaphragm facing away from the oil, and means connecting said space to the atmosphere.

2. Conservator system according to claim 1, having a drying apparatus (16') in said last connecting means for drying air passing into said space.

3. Conservator system according to claim 1, the conservator tank being provided with a valve means (17) for filling non-combustible gas into said upper portion of the conservator tank.

4. Conservator system according to claim 1, in which said circulation means includes a conduit (4) which conveys hot oil to the conservator tank, and a gas bubble indicating device in said conduit.

5. Conservator system according to claim 1, in which the conservator tank is provided with means for indicating the level of the oil surface in the conservator tank.

6. Conservator system according to claim 1, said conservator tank being provided with means for indicating development of combustible gas in the apparatus, said means being connected with the upper portion of the conservator tank.

* * * * *